United States Patent [19]
Dahlem et al.

[11] 3,945,315
[45] Mar. 23, 1976

[54] HYDRAULIC SCRAP SHEARING MACHINE

[75] Inventors: Peter Dahlem, Hilden; Hubert Milles, Dusseldorf, both of Germany

[73] Assignee: Lindemann Maschinenfabrik GmbH, Dusseldorf, Germany

[22] Filed: Apr. 16, 1975

[21] Appl. No.: 568,388

[30] Foreign Application Priority Data
May 13, 1974 Germany............................ 2423003

[52] U.S. Cl. .................... 100/95; 83/923; 100/232; 100/233; 100/269 R; 100/295
[51] Int. Cl.² .......................................... B30B 9/32
[58] Field of Search ........ 83/923; 100/232, 233, 95, 100/295, 269 R

[56] References Cited
UNITED STATES PATENTS

| | | | |
|---|---|---|---|
| 2,932,247 | 4/1960 | Thompson | 100/232 |
| 3,101,045 | 8/1963 | Van Endert | 100/295 X |
| 3,283,697 | 11/1966 | Findlay | 100/95 |
| 3,603,245 | 9/1971 | Pioch | 100/295 X |
| 3,610,138 | 10/1971 | Galter | 100/95 |

*Primary Examiner*—Billy J. Wilhite
*Attorney, Agent, or Firm*—Toren, McGeady and Stanger

[57] ABSTRACT

In a hydraulic scrap shearing machine having scrap shears at one end of an open feed channel which is wider than the mouth of the shears and which has one of its opposite side walls movable towards the other to squash scrap placed in the feed channel to a final width which will allow the scrap to be pushed by a feeder ram along the feed channel and into the mouth of the shears, the movable side wall is formed by the working faces of a main hydraulic ram and an auxiliary hydraulic ram which can be advanced independently of the main ram, the working face of the auxiliary ram being situated adjacent the mouth of the shears and being shorter than the working face of the main ram measured in the direction of the feed channel. Normally the main and auxiliary hydraulic rams are operated so that their working faces, together forming the whole of the movable side wall, are advanced and retracted together. However, if this operation fails to squash sufficiently the scrap in the feed channel, the auxiliary ram is operated so that its working face advances relative to the face of the main ram to squash further the scrap in the region adjacent the mouth of the scrap shears.

5 Claims, 7 Drawing Figures

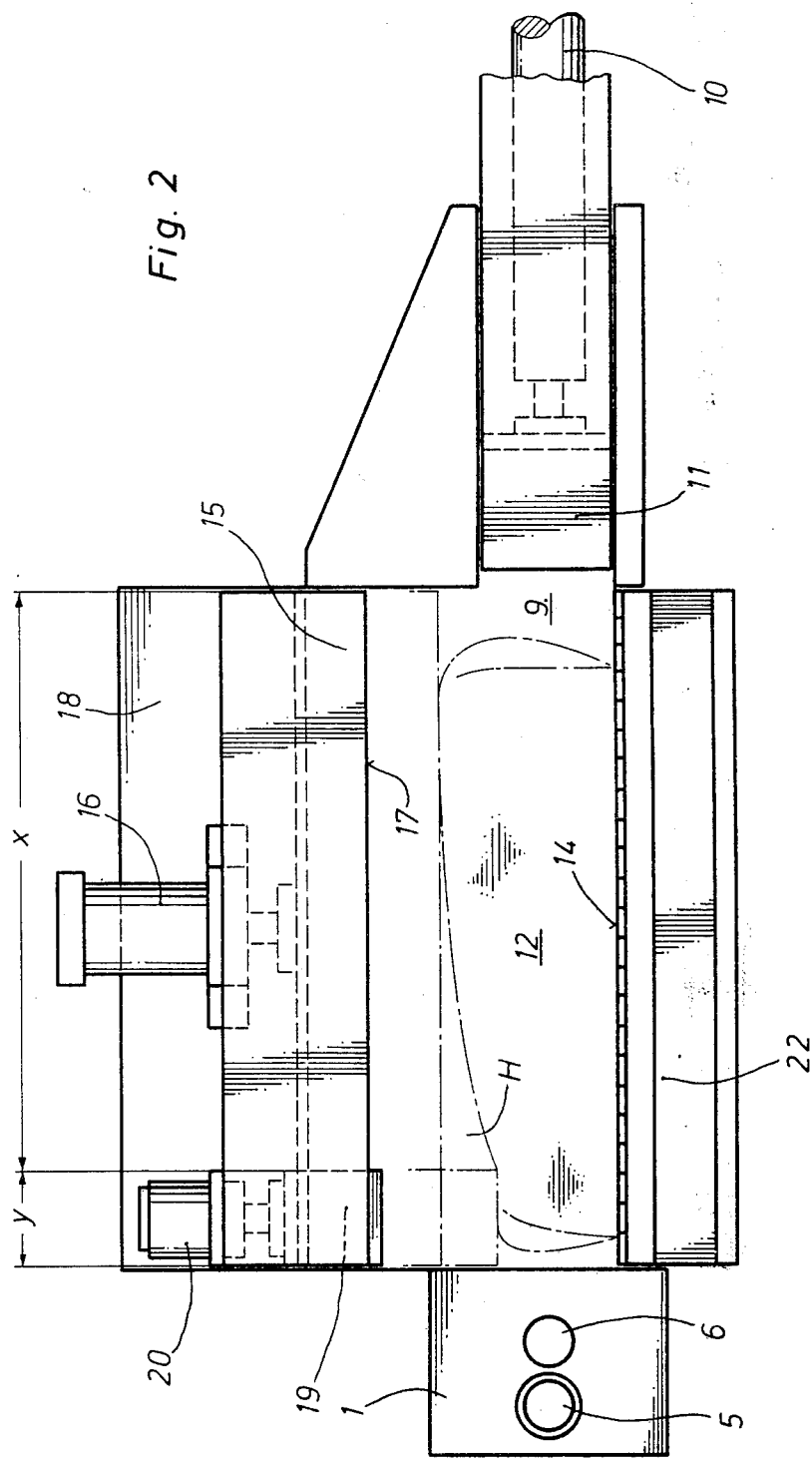

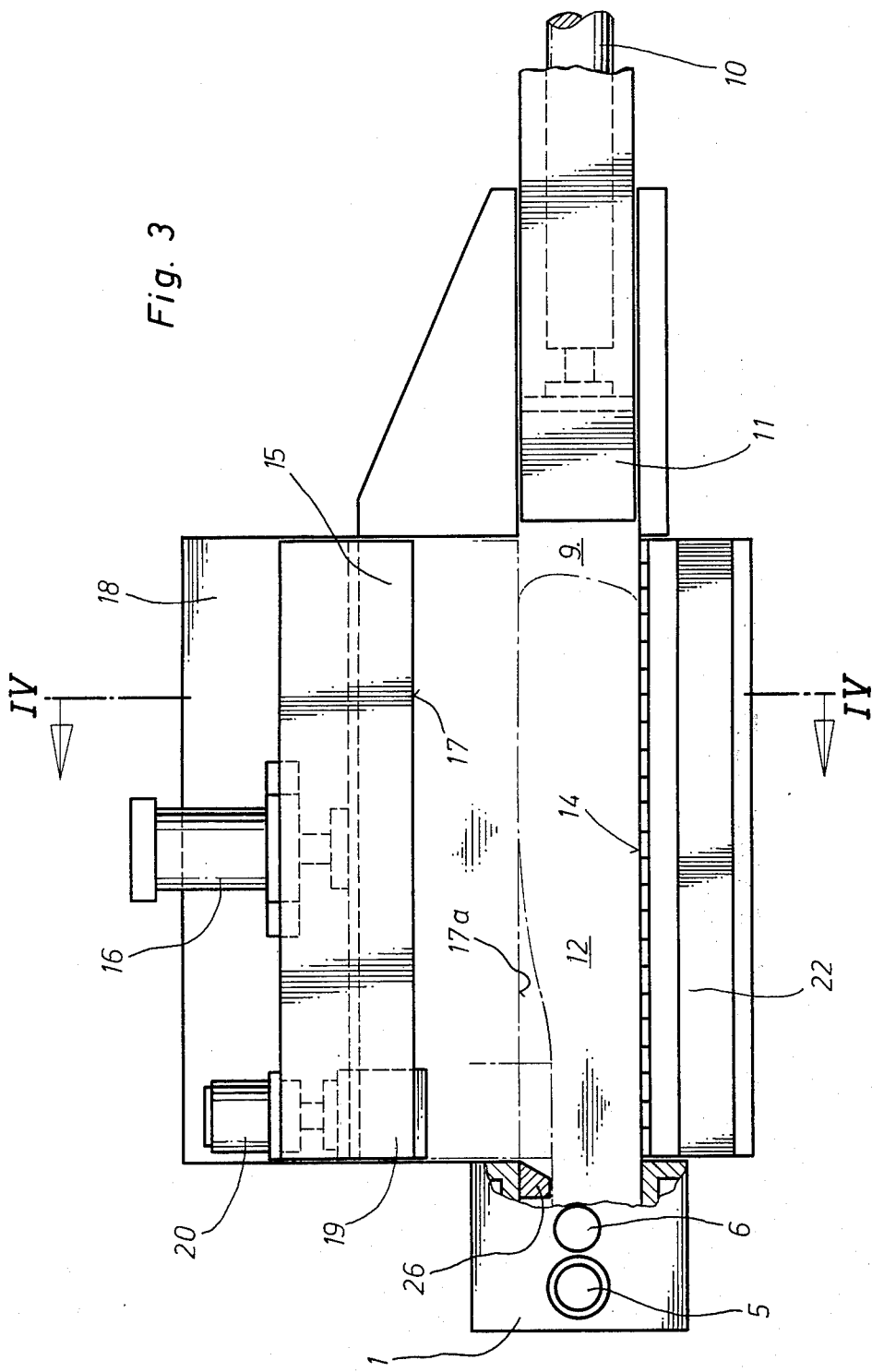

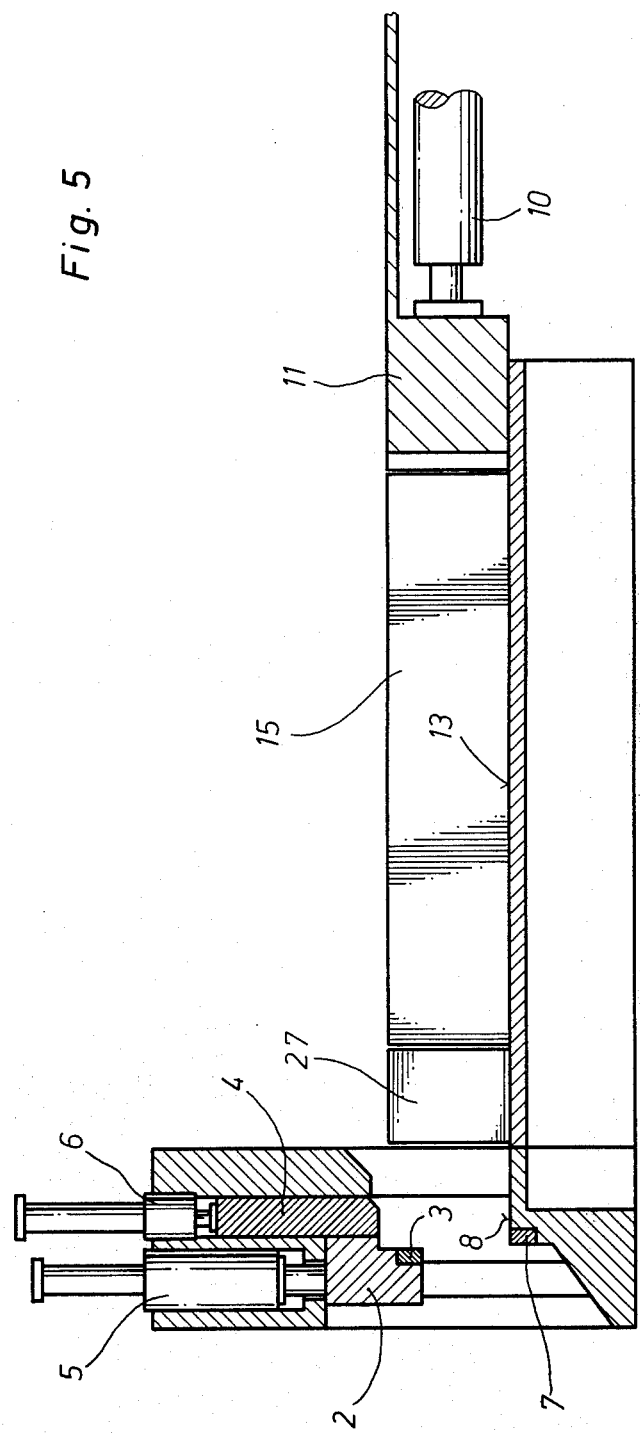

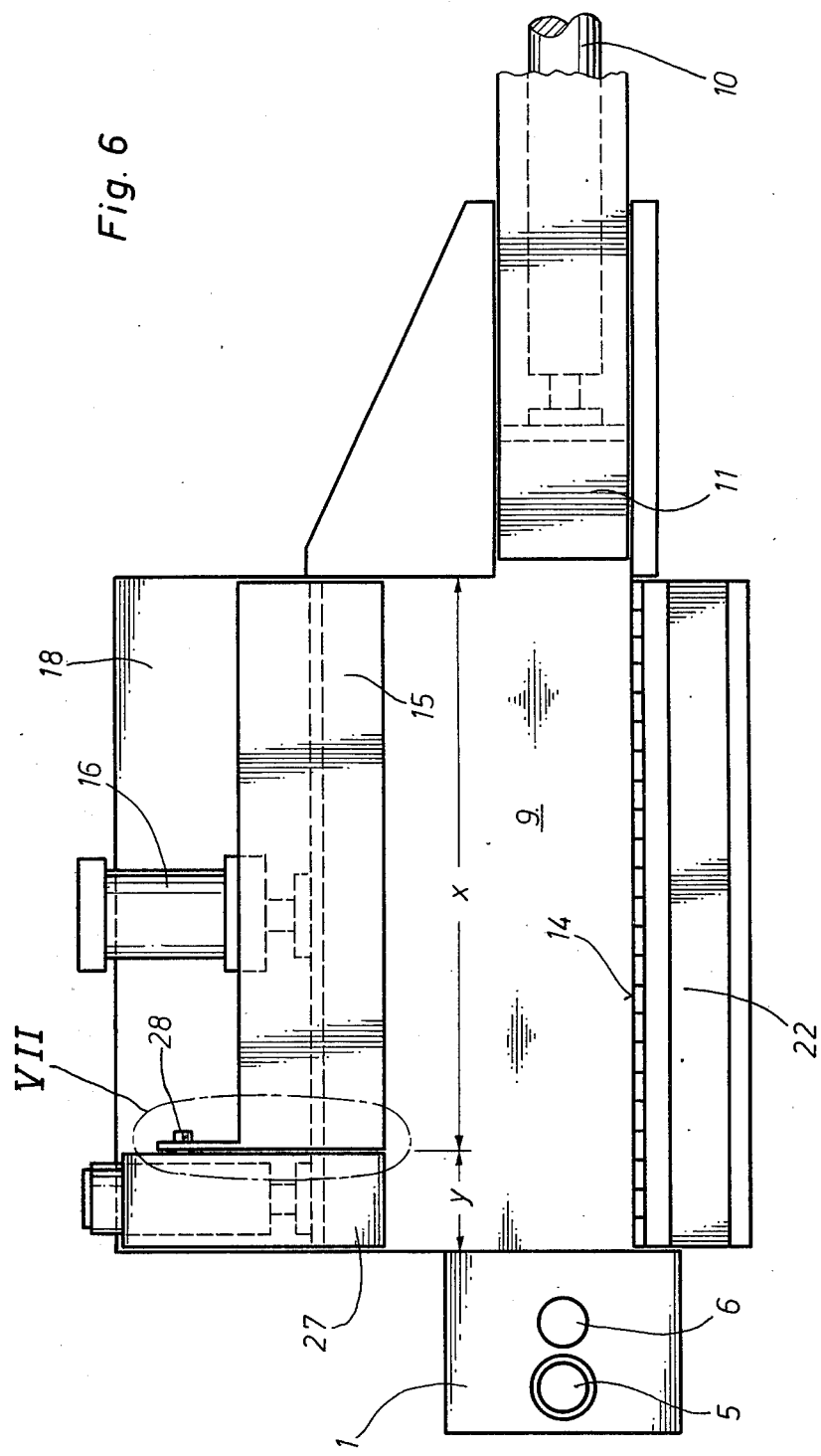

3,945,315

HYDRAULIC SCRAP SHEARING MACHINE

Manufacturing costs of hydraulic scrap-shearing machines depend largely on the width of the mouth of the scrap shears. This determines not only the dimensions of the shearing cutters, but also the power requirements, and therefore the cost, of the hydraulic system which operates the machine. To reduce manufacturing costs it is known to use an open feed channel which is wider than the mouth of the shears, and to arrange the feed channel so that it functions as a sideways-acting press, thereby squashing the scrap sideways in the channel to reduce its width before feeding it into the comparatively narrow mouth of the shears. A machine of this kind can handle, for example, scrap in the form of containers and pipes of large diameter. In one known machine of this kind the two side-walls of the feed channel are pivoted so that they form jaws, and when the jaws are open, the distance between them is considerably greater than the width of the mouth of the shears. Consequently, large-diameter scrap such as tanks and pipes can be charged to the feed channel, and bringing together of the two side-walls to close the jaws then squashes the charge of scrap to a sufficiently narrow width to allow it to be fed through the mouth of the shears. It is also known, as an alternative, to arrange the side-walls so that they can slide towards and away from each other, rather than pivoting.

However, these arrangements have the disadvantage that a very high thrust is required for squashing the scrap, particularly if the scrap occupies the entire length of a large fraction of the length, of the side-walls. To reduce the thrust required, it has been proposed that only a short portion of one of the side-walls of the feed channel acts to squash the scrap from the side. This portion of the side-wall is provided by the working face of a sideways acting hydraulic ram and is situated just in front of the mouth of the shears, that is to say just upstream of the mouth of the shears. The scrap is advanced stepwise towards the mouth of the shears, and at each step the sideways-acting ram, which is comparatively short in the longitudinal direction of the channel, squashes together the forward or leading end-portion of the scrap, reducing its width enough to allow this portion of the scrap to be pushed through the mouth of the shears, which thereupon cut off this portion of the scrap. The process is repeated stepwise along the length of the scrap. Scrap-shearing machines of this construction function well enough, but comparatively slowly because for economic reasons the scrap cannot be simultaneously squashed and cut. This would require the machine to have two hydraulic systems, making it excessively costly to manufacture. In practice, a scrap-shearing machine can be manufactured at reasonable cost only if it is equipped with a single hydraulic system.

The aim of the present invention is to provide a hydraulic scrap-shearing machine equipped with an open feed channel which is wider than the mouth of its scrap shears and in which the scrap is squashed sideways to reduce its width sufficiently for the scrap to be pushed into the mouth of the shears, the machine being free from the disadvantages of the machines of known construction mentioned above. The aim is achieved by the invention, by combining to a certain extent the constructions of the known machines mentioned above.

According to the invention therefore, we provide a hydraulic scrap-shearing machine having scrap shears at one end of an open feed channel which is wider than the mouth of the shears and which has one of its opposite side-walls movable towards the other to squash scrap placed in the feed channel to a final width which will allow the scrap to be pushed by a feeder ram along the feed channel and into the mouth of the shears, the movable side wall being formed by the working faces of a main hydraulic ram and an auxiliary hydraulic ram which can be advanced independently of the main ram, the working face of the auxiliary ram being situated adjacent the mouth of the shears and being shorter than the working face of the main ram measured in the direction of the feed channel.

The machine functions as follows. Let it be assumed that a piece of scrap has been charged into the feed channel and that the scrap is too wide to be pushed into the mouth of the shears. Also let it be assumed that the movable side-wall of the feed channel, advancing as a whole laterally inwards to squash the scrap sideways in the channel, cannot squash the scrap enough to allow the scrap to be pushed into the mouth of the shears. The side-wall of the feed channel is therefore brought to a standstill by the scrap, and the auxiliary ram is then operated on its own, advancing its working face forming the shorter portion of the side-wall further so that the scrap is squashed together more in this region. In this way the leading portion of the scrap, just upstream of the mouth of the shears is squashed more than the remainder of the scrap. The auxiliary ram exerts a greater squashing pressure because its working face has a smaller area than the working face of the main ram. The auxiliary ram squashes the forward portion of the scrap to a width which is less than the width of the mouth of the shears, and is then retracted to its original position, relative to the main ram. The scrap is then pushed forwards into the mouth of the shears by a distance at least equal to the length of the working face of the auxiliary ram.

The scrap now remaining in the feed channel is shorter than it was before, and consequently it is easier to squash further together. It should be observed that the action of the auxiliary ram deforms the portion of scrap remaining in the feed channel and this also reduces the unsquashed length of scrap remaining in the feed channel, that is to say reduces the length of contact over which the main ram now acts on the remaining scrap. In practice it has been found that after one or two strokes of the auxiliary ram the remaining scrap can often be squashed sufficiently merely by advancing the side-wall as a whole, that is to say with the retracted auxiliary ram locked, mechanically or hydraulically, to the main ram. In other words, the movable side-wall of the feed channel, acting as a single unit, is now able to squash the remaining scrap to the width necessary for it to pass through the mouth of the shears.

Two examples of scrap-shearing machines in accordance with the invention will now be described with reference to the accompanying drawings, in which:

FIG. 2 is a plan view of the machine of FIG. 1 during a first phase of its operation;

FIG. 3 is a view similar to that of FIG. 2, but showing the machine in a second phase of operation;

FIG. 5 is a longitudinal section through the second scrap-shearing machine;

FIG. 6 is a plan view of the machine of FIG. 5; and

Figure 1:
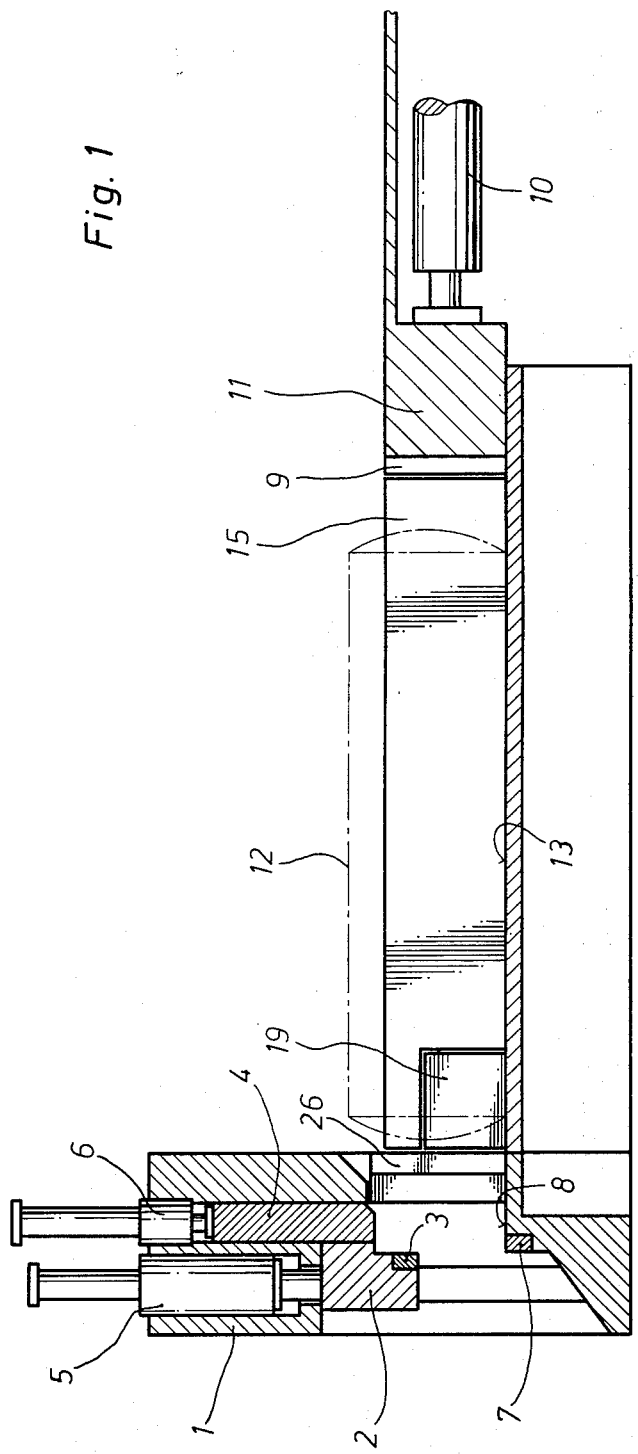
FIG. 1 is a longitudinal section through one of the scrap-shearing machines.

The scrap-shearing machine shown in FIGS. 1 to 4 consists, as is conventional, of a shear-stand 1 in the form of a portal in which the holder 2 of an upper cutter 3, together with a combined stamper and hold-down 4, are driven to move up and down by double-acting hydraulic cylinders 5 and 6. The upper cutter 3 is arranged to cooperate with a stationary lower cutter 7, and the stamper and hold-down 4 is arranged to cooperate with a machine table 8 for supporting the scrap adjacent the cutter 7. The machine is equipped with a feed channel 9 along which the scrap is pushed into the mouth of the shears, which comprise the cutters 3 and 7, by a ram head 11 driven by a double-acting ram cylinder 10. The scrap, which in the example shown is indicated as a cylindrical steel container 12, is fed stepwise to the shears. Very little thrust is required for feeding the scrap to the shears, compared with the downward thrust which has to be applied to the upper shearing cutter 3. The general construction described so far is well known.

In this example in accordance with the invention, the feed channel 9, which is open at the top, comprises a stationary bottom 13, a stationary side-wall 14 (FIG. 2), and, opposite the wall 14, a main side-ram 15 which squashes the scrap sideways in the feed channel 9 by advancing transversely of the channel towards the stationary side-wall 14 under the action of a double-acting hydraulic cylinder 16. The working face of the main side-ram 15 is shown at 17 in FIGS. 2 and 3. During the sideways squashing operation the cylinder 16 advances the working face 17 of the side-ram 15 at least as far as the chain line 17a shown in FIG. 3.

The cylinder 16 of the main side-ram 15 is fixed to a portion 18 of the machine frame, and fixed to the main side-ram 15 is the double-acting hydraulic cylinder 20 of an auxiliary side-ram 19 whose working face, when the auxiliary side-ram 19 is retracted, forms a continuation of the working face 17 of the main side-ram 15 at its end nearest the mouth of the shears. The total working surface of the two side-rams 15 and 19 extends substandially the length of the feed channel 9 and comprises a longer section x provided by the ram 15 and a considerably shorter section y provided by the ram 19 just upstream of the mouth of the shears.

Figure 4:
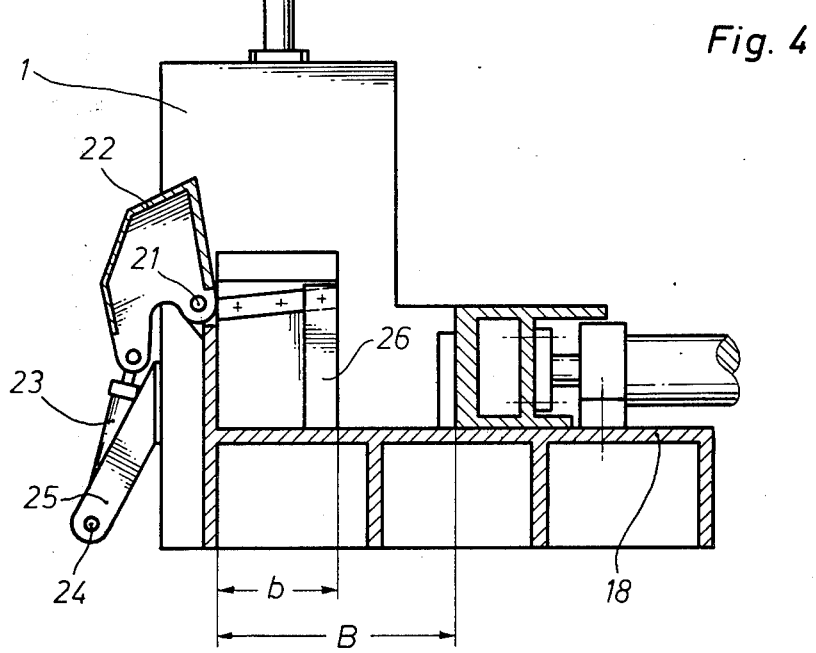
FIG. 4 is a section taken in the plane IV—IV of FIG. 3.

As shown in FIG. 4, the maximum width B of the feed channel 9 is considerably greater than the width b of the mouth of the shears. The function of the auxiliary side-ram 19 is to ensure that the scrap is squashed sideways at its leading end sufficient to enter the mouth of the shears, as will be explained in greater detail further below. The scrap-shearing machine as is conventional in such machines having an open feed channel, is equipped with a downthrust plate 22, as shown in FIG. 4, pivoted about an axis 21 for squashing the scrap downwards in the channel 9 before it enters the mouth of the shears. This is necessary in case the scrap bulges upwards as a result of transverse or axial thrusts on the scrap. The downthrust plate 22 is powered by a hydraulic cylinder 23 which is pivoted by a pin 24 on an arm 25 fixed to the machine frame.

The scrap-shearing machine described so far functions as follows. Let it be assumed that the scrap is in the form of an elongated cylindrical container 12, as indicated in chain lines in FIGS. 1 to 3. If this is a comparatively thin-walled container, the auxiliary side-ram 19 need not be brought into action on its own. Powered by the cylinder 16, the side-ram 15 is advanced so that the combined working surfaces of the rams 15 and 19 squashes the container sideways until it is a little narrower than the width b of the mouth of the shears. The ram head 11 then pushes the squashed scrap stepwise into the mouth of the shears, if necessary with the help of the downthrust plate 22.

On the other hand, if the container 12 is comparatively thick-walled, so that the combined working surfaces of the side-rams 15 and 19 are unable to squash the scrap sideways sufficiently solely under the action of the cylinder 16, the scrap bringing the side-ram 15 to a standstill while the scrap still has a width greater than the mouth of the shears, then the auxiliary side-ram 19 is advanced independently of the ram 15. Due to its smaller working surface, the ram 19 is able to squash the leading end-portion of the scrap container 12 together more, as indicated by the chain lines in FIG. 2, using comparatively little hydraulic pressure. The auxiliary side-ram 19 squashes the leading end of the scrap enough for it to be pushed through the mouth of the shears, and the squashed leading portion of the scrap 12 is then pushed into the mouth by the ram head 11.

The remaining portion of the scrap is now easier to squash sideways, firstly because its length has been reduced by a distance y, and secondly because the leading portion of what remains of the container has already been deformed slightly by the previous action of the auxiliary side-ram 19, as shown at H in FIG. 2. It will be observed that the length of scrap which the working face 17 of the main side-ram 15 has to squash together is even further reduced by this deformation. In many cases the scrap remaining in the feed channel 9 can now be squashed sideways to the desired size simply by using the side-rams 15, 19 together, without separate actuation of the auxiliary side-ram 19, the combined working faces of the side-rams 15, 19 now squashing the remaining scrap in one operation down to the width less than the width b of the mouth of the shears.

In many cases it is desired to squash the scrap sideways to a width which is less by a definite amount than the full width b of the mouth of the shears. To arrange this, the scrap-shearing machine is equipped with a barrier plate 26 which can be inserted when desired, as shown in FIGS. 3 and 4, to reduce the effective width of the mouth of the shears. The stroke of the auxiliary side-ram 19 will of course be adjusted to match the reduced width of the mouth.

Figure 7:
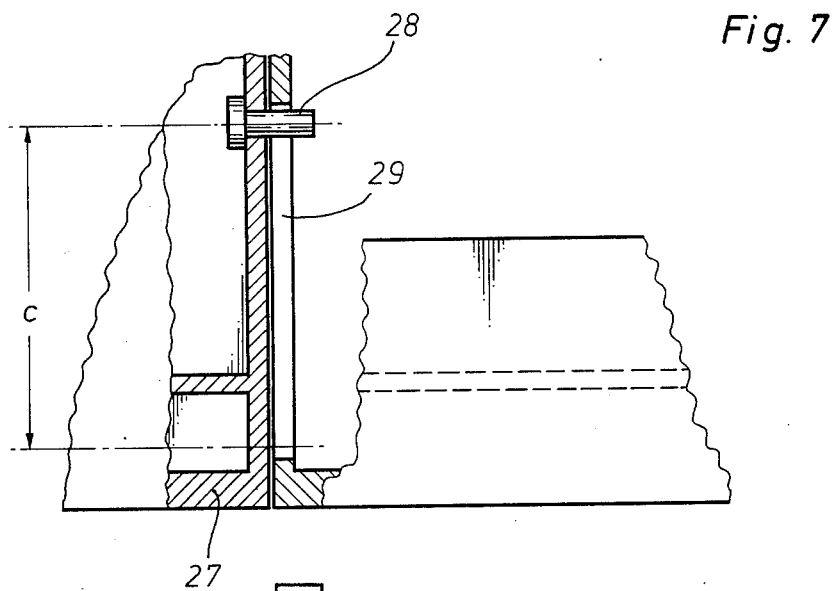
FIG. 7 shows, on a larger scale, the detail indicated at VII in FIG. 6.

In the scrap shearing machine shown in FIGS. 5 and 6, parts which correspond to parts of the machine shown in FIGS. 1 to 4 are given the same reference numerals. In this second example the auxiliary side-ram, in this case numbered 27, is supported by the portion 18 of the machine frame, rather than by the main side-ram 15, and the hydraulic system which controls the operation of all the hydraulic cylinders is arranged to ensure that the auxiliary side-ram 27 moves so that the machine functions essentially as described for the first example. The movements of the two side-rams 15 and 27 operating over the two axial portions x and y of the feed channel 9 may be coordinated in the desired manner solely by the hydraulic control system. On the other hand, if desired, the mechanical arrangements shown in FIGS. 6 and 7 can be included, giving a positive mechanical connection between the two side-rams 15 and 19. As shown in FIG. 7, the auxiliary side-ram 27 has a projecting pin 28 which projects into a slot 29 in the wall of the main side-ram. The arrangement limits the stroke of the auxiliary side-ram 27, relative to the main side-ram 15, to the effective slot length $c$.

We claim:

1. In a hydraulic scrap-shearing machine comprising an open feed channel having two opposing side walls, scrap shears at one end of said feed channel and having a mouth narrower than the normal width of said feed channel between said side walls, hydraulic means for moving at least one of said side walls towards the other of said side walls whereby scrap placed in said feed channel can be squashed to a final width no greater than the width of said mouth of said scrap shears, and a feeder ram for pushing scrap along said feed channel into said mouth of said scrap shears, the improvement consisting of said movable one of said side walls being divided into two longitudinal portions of different lengths, and said hydraulic means comprising a main hydraulic ram having a working face forming the longer portion of said movable side wall, and an auxiliary hydraulic ram having a working face forming the shorter portion of said movable side wall just upstream of said mouth of said scrap shears, said auxiliary hydraulic ram being capable of operation independently of said main hydraulic ram.

2. A scrap shearing machine as claimed in claim 1, wherein said other of said side walls of said feed channel is stationary, and said mouth of said scrap shears is positioned eccentrically whereby one side of said mouth coincides with said stationary side wall of said feed channel.

3. A scrap shearing machine as claimed in claim 1, wherein said auxiliary hydraulic ram is mounted on said main hydraulic ram.

4. A scrap shearing machine as claimed in claim 1, wherein said auxiliary hydraulic ram is mounted independently of said main hydraulic ram.

5. A scrap shearing machine as claimed in claim 1, wherein said machine includes a barrier plate mounted for insertion when desired into said mouth of said scrap shears to reduce the effective width of said mouth.

* * * * *